United States Patent [19]

Medwin

[11] 4,417,313
[45] Nov. 22, 1983

[54] METHOD FOR OPTIMIZING THE DESIGN OF A FINITE NOISE BARRIER

[76] Inventor: Herman Medwin, 4021 Sunridge Rd., Pebble Beach, Calif. 93953

[21] Appl. No.: 264,483

[22] Filed: May 18, 1981

[51] Int. Cl.³ .............................................. G06F 15/31
[52] U.S. Cl. .................................. 364/524; 181/296; 367/901
[58] Field of Search ................ 364/524, 488; 181/210, 181/284, 296; 367/901, 191

[56] References Cited

U.S. PATENT DOCUMENTS

| | | | |
|---|---|---|---|
| 3,573,446 | 4/1971 | Bergland | 235/156 |
| 3,686,490 | 8/1972 | Goldstone | 235/156 |
| 3,778,604 | 12/1973 | Bosc et al. | 235/152 |
| 3,783,258 | 1/1974 | Chwastyk | 235/156 |
| 3,881,097 | 4/1975 | Lehmann et al. | 235/156 |
| 3,881,100 | 4/1975 | Works et al. | 235/156 |
| 4,058,715 | 11/1977 | Niwa | 364/726 |
| 4,094,251 | 4/1978 | Gillis, Jr. | 364/726 |
| 4,095,669 | 6/1978 | Bond, Sr. | 181/210 |
| 4,175,639 | 11/1979 | Wirt | 181/210 |
| 4,228,867 | 10/1980 | Wirt | 181/210 |
| 4,306,631 | 12/1981 | Reusser | 181/210 |
| 4,330,046 | 5/1982 | Lerner et al. | 181/210 |

OTHER PUBLICATIONS

Nakajima et al., "New Instrument for Rapid & Accurate Measurement of Ultrasonic Velocity & Attenuation Using a Minicomputer System" *Japanese J. of Applied Physics*, vol. 18, No. 7, Jul. 1979, pp. 1379–1385.

*Primary Examiner*—David H. Malzahn
*Attorney, Agent, or Firm*—R. F. Beers; Charles D. B. Curry; George L. Craig

[57] ABSTRACT

A method for optimizing the design of finite noise barriers by using an extension of the Biot-Tolstoy rigorous closed form impulse solution for diffraction of an acoustic pressure pulse by an infinite rigid wedge. An initial finite barrier is defined and then a calculation made of the impulse signal transmitted on one side of the barrier and received on the other side by adapting the Biot-Tolstoy solution to a digital computer. The integrals of the acoustic pressure impulse are calculated for each source/receiver path for each segment of the barrier. The integrals are then compared and the segments are adjusted and new calculations made until all integral contributions are equal. The integrals are then digitally Fourier transformed to determine attenuation at the desired frequencies. After comparison with the desired attenuation, all segments are proportionately adjusted and the entire computational process reiterated until the optimal attenuation is achieved.

2 Claims, 12 Drawing Figures

FIG_1

FIG_2

FIG_3

FIG_4

FIG_6A

FIG _ 6B

FIG_7

FIG_8A

FIG_8B

FIG_8C

FIG_9

METHOD FOR OPTIMIZING THE DESIGN OF A FINITE NOISE BARRIER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to noise barriers, and more particularly to a method for optimizing the design of a finite noise barrier.

2. Description of the Prior Art

Previous noise barrier designs used the theory for an infinite barrier for the design of a finite barrier, thereby ignoring or improperly calculating the end effects. The height of the barrier was increased to maximize the shadowing and the edge effects were generally estimated. Complex barriers were assumed to be similar to infinite simple barriers.

SUMMARY OF THE INVENTION

Accordingly, the present invention provides a method for optimizing the design of finite noise barriers by using an extension of the Biot-Tolstoy rigorous closed form impulse solution for diffraction by an infinite rigid wedge. Straight edged sections of a proposed complex barrier are defined, then the time required for a signal to go from source to each of the ends of each segment to the receiver, as well as the "least time" over each segment or its extrapolation, is defined. A calculation of the impulse received for a delta function source is then made by adapting the modified Biot-Tolstoy theory to a digital computer. Using proper initiation and termination times the time series of the limited signal received by passage of an impulse over each segment is defined. The time series are added for all paths including image paths at their proper starting times and graphed. The integral of the acoustic pressure impulse is calculated for each path, for each segment. A comparison of the impulse integrals indicates which segments should be heightened or extended to produce equal diffraction contributions by each path. By iteration the segments are optimized in height and extent so that all integral contributions are equal. The time series is Fourier transformed (FFT) to determine the attenuation at the desired frequencies. If the attenuation is inadequate all segments of the barrier are lengthened proportionately, maintaining equal impulse integrals; if the attenuation is excessive the segments are shortened in like manner so that the maximum required attenuation is achieved at the minimum cost of the noise barrier.

Therefore, it is an object of the present invention to provide a method for optimizing the design of a finite noise barrier.

Another object of the present invention is to achieve the maximum required attenuation at the minimum cost of the noise barrier.

Other objects, advantages and novel features of the present invention will be apparent from the following detailed description when read in conjunction with the appended claims and attached drawings.

DESCRIPTION OF THE PREFERRED EMBODIMENT

Theoreticl discussions of sound shadowing by noise barriers generally are based on the vast literature describing the frequency dependence of continuous wave (CW) diffraction by infinite plates and wedges. On the other hand the practical prediction of attenuation by noise barriers has leaned almost totally on laboratory experiments which, of necessity, employ pulse techniques with finite scale models of the real world situation. Biot and Tolstoy's paper on normal coordinates provided a closed form solution to the diffraction of a pulse by an infinite rigid wedge. The Biot-Tolstoy pulse solution for an infinite wedge is a building block which, when used in conjunction with digital computer techniques, produces both time and frequency domain solutions to real world problems of shadowing by finite noise barriers.

The advantage of the pulse description when adapted to digital computer calculations is the same as in physical model experiments which use pulse techniques; an identifiable diffracted contribution from each barrier edge can be initiated at the least time when the pulse reaches the edge, it can be terminated at the instant when the pulse has passed the end of the diffracting edge, and superposition can give the total impulse when there is more than one edge. The total temporal response can then be Fourier transformed digitally to provide the desired frequency response of the finite barrier.

The theoretical basis for the computer modeling procedures starts with a simple modification of the Biot-Tolstoy closed form solution for diffraction by an infinite rigid wedge. We assume a point source S (volume/time) which starts to flow uniformly and instantaneously at $t=0$ so that at range R after time $t\partial\phi/\partial = (-S/4\pi R) 1 (t-R/c)$. Since the acoustic pressure is given by $$p = -\rho \frac{\partial^2 \phi}{\partial t^2}$$

the point source radiates a delta function of pressure $$p = \frac{\rho S}{4\pi R} \delta(t - R/c).$$

Since the boundary conditions at the rigid wedge are the same for $\phi$ or $\partial\phi/\partial t$ the derivation is unchanged from that of Biot and Tolstoy. The following simple expression is derived for the pressure diffracted by a rigid wedge:

$$p(t) = \frac{-S\rho c}{4\pi \theta_w} [rr_o\sinh y]^{-1} \exp(-\pi y \theta_w) \left\{ \frac{\sin[(\pi/\theta_w)(\pi \pm \theta \pm \theta_o)]}{1 - 2\exp(-\pi y/\theta_w)\cos[\pi/\theta_w)(\pi \pm \theta \pm \theta_o] + \exp(-2\pi y/\theta_w)} \right\} \quad (1)$$

$$\text{where } y = \text{arc cosh} \left[ \frac{c^2 t^i - (r^2 + r_o^2 + Z^2)}{2rr_o} \right] \quad (2)$$

Figure 1:
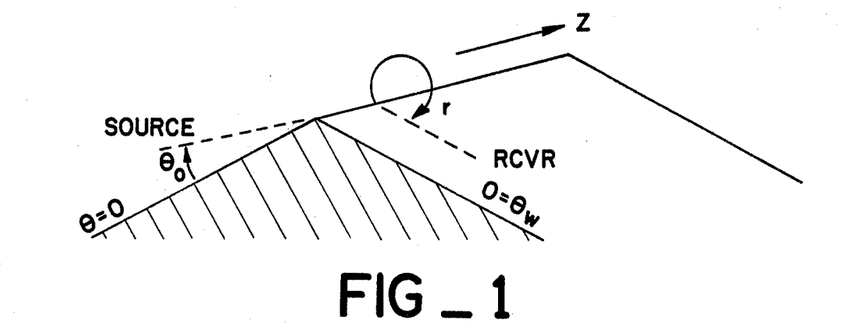
FIG. 1 is a schematic of the diffraction of an acoustic pressure pulse by a rigid wedge.

The term $(\pi \pm \theta \pm \theta_o)$ is written for simplicity; the curly bracket consists of the sum of four terms obtained by using the four possible combinations of the angles. Source coordinates are $(r_o, \theta_o, 0)$; receiver coordinates are $(r, \theta, Z)$. The angle of the wedge measured in the fluid region is called $\theta_w$, see FIG. 1. The plate or semi-infinite screen is a wedge with $\theta_w = 2\pi$. Also, the $\rho$ is fluid density; c, speed of sound in the fluid; $t=0$ is time of source impulse.

The interaction of the spherically diverging pulse with an infinite wedge results in reradiation from the crest line, first at the point of intersection of the least time path with the crest line, then from the moving intercepts of the spherical wave on each side of that point. It is the pressure at, and near, the least time of the source-crest-receiver path that represents the major part of the diffracted energy for each wedge. Therefore the least time over the wedge is $$\tau_o \equiv [(r+r_o)^2 + Z^2]^{\frac{1}{2}}/c \quad (3)$$

and the time after the least time is $\tau \equiv t - \tau_o$. The principal part of the diffracted pressure pulse is determined by the first square bracket of equation (1), $$[rr_o\sinh y]^{-1} = [\tfrac{1}{4}(c^2 t^2 - c^2 \tau_o^2 + 2rr_o)^2 - r^2 r_o^2]^{-\frac{1}{2}} \quad (4)$$

which, for $\tau << \tau_o$ is $$[rr_o\sinh y]^{-1} = (2\tau\tau_o c^2 rr_o)^{-\frac{1}{2}} \quad \tau << \tau_o \quad (5)$$

also $\underset{\tau/\tau_o \to 0}{\text{Lim }} y = 0$ so that the small time, early diffracted pressure is $$p_s(t) = S\rho\beta/[4\pi\sqrt{2\theta_w}(\tau\tau_o rr_o)^{\frac{1}{2}}] \quad (\tau/\tau_o) << 1 \quad (6)$$

where $\beta$ is the curly bracket in (1).

Figure 2:
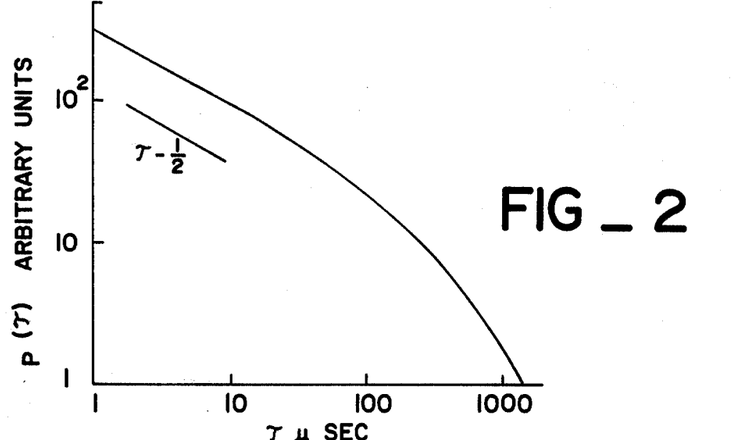
FIG. 2 illustrates the time varying pressure pulse response for symmetrical source/receiver locations about an infinite wedge.

A graph of the time-varying pulse response described by equation (1) is given in FIG. 2 for the case of symmetrical source/receiver locations for an infinite wedge ($\theta_w = 270°$). The $\tau^{-\frac{1}{2}}$ dependence pridicted by equation (6) is indicated on the graph.

It is conventional to report measurements of diffraction loss in the frequency domain. Although there is no complete analytical transform of equation (1) a digital transform is quite simple. For infinite wedges or plates there is also a compromise technique which adds physical insight to the pragmatic virtue of a discrete transform by describing the early arrivals quite accurately. The device is to add the analytical transform of the small $\tau$ behavior described by equation (6) to a digital transform of the remaining part of equation (1). For this purpose equation (6) is rewritten $$p_s(t) = A\tau^{-\frac{1}{2}} \quad (7)$$

where $$A = s\rho\beta/[(4\pi\theta_w)(2\tau_o r_o r)^{\frac{1}{2}}] \quad (8)$$

and the remainder is calculated from equation (1):

$$e(t) = p(t) - A\tau^{-\frac{1}{2}} \quad (9)$$

The Fourier transform of equation (7) is $$P_s(f) = (A/2)(1+i)f^{-\frac{1}{2}} \quad (10)$$

and writing the digital transform of e(t) as $$E(f) = B(f) + i\, C(f) \quad (11)$$

the spectral pressure is $$P(f) = \left[ \left( \frac{A}{2\sqrt{f}} + B\Delta T \right)^2 + \left( \frac{A}{2\sqrt{f}} + C\Delta T \right)^2 \right]^{\frac{1}{2}} \quad (12)$$

The reciprocal of the sampling frequency, the digital sampling time interval, $\Delta T$, is introduced in order to normalize to the analytical solution. Similarly, for the computer the reference white noise spectral pressures at range R from the delta function point source of strength S in an infinite medium are given by $$P_\delta(f) = \frac{S\rho}{4\pi R \Delta T} \quad (13)$$

The diffraction loss relative to direct free field transmission at range R is $$DL = 20 \log_{10} P(f)/P_\delta(f) \quad (14)$$

Figure 3:
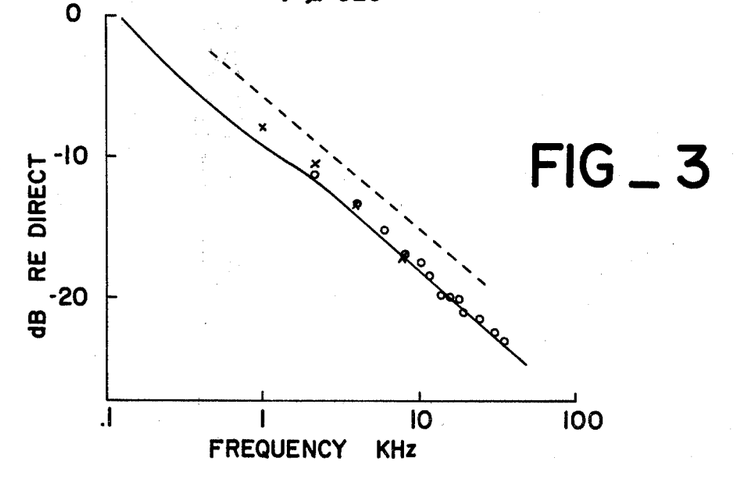
FIG. 3 illustrates the spectrum of a diffracted pressure pulse as shown in FIG. 2.
Figure 4:
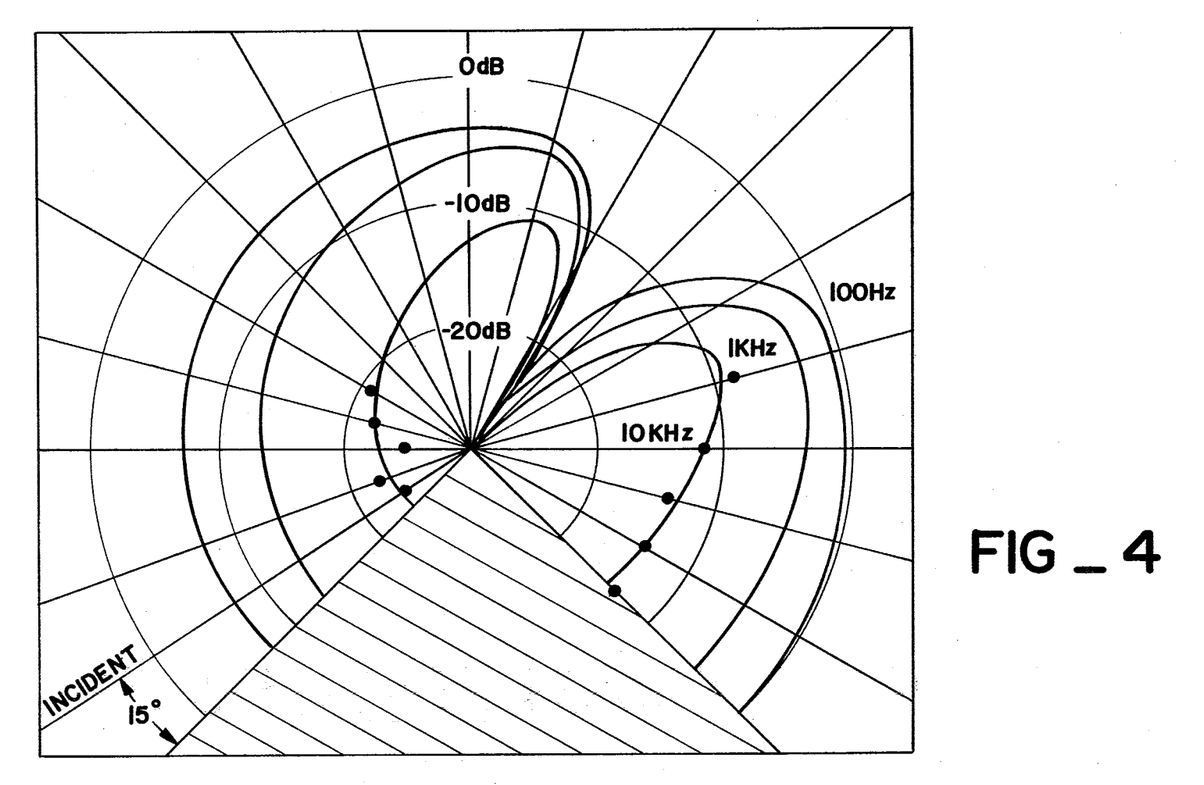
FIG. 4 shows the polar diffraction pattern for backscatter and forward scatter of an infinite rigid wedge.

FIG. 3 shows the sequence of the diffracted signal whose temporal behavior was given in FIG. 2. The solid line data points are in excellent agreement with the prediction of equation (14). On the other hand the CW theoretical predictions (dashed line) of other investigators are about 2 or 3 dB higher than both experimental measurements. Further confirmation of the applicability of equation (14) is found in FIG. 4 which presents the polar diffraction pattern for backscatter as well as forward-scatter for an infinite wedge. For $\theta \leq 90°$ and $210° \leq \theta \leq 270°$ there is good agreement between predictions and experiment.

Figure 5:
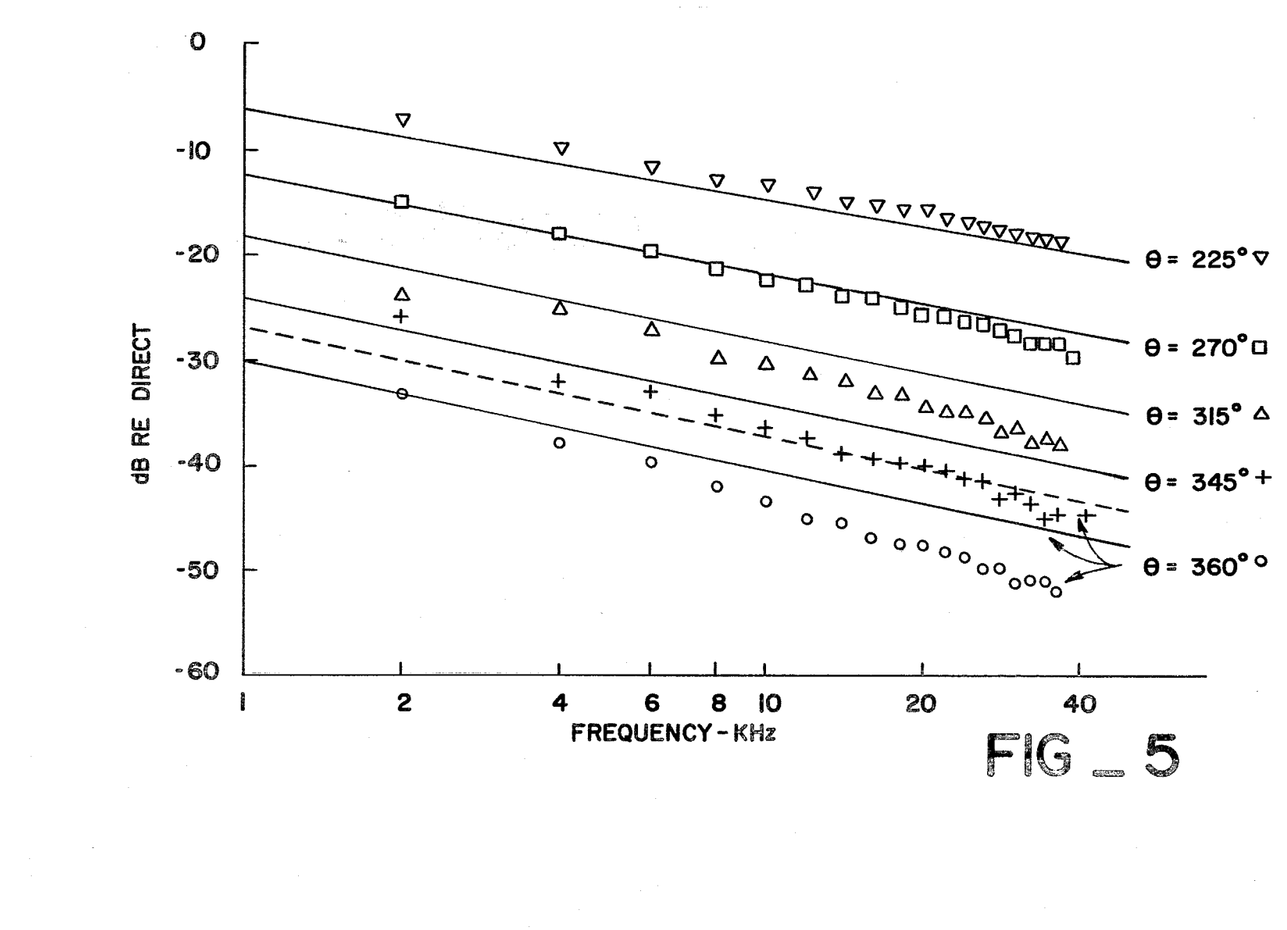
FIG. 5 describes diffraction of a pressure pulse over an infinite plate for a source located along a line at 15° to the plate.

Diffraction over an infinite plate is described in FIG. 5 for a source along a line at 15° to the plate. The discrepancy between theory and experiment is less than 1.5 DB for $\theta \leq 270°$, Fresnel number, $0.2 \leq N \leq 20$ where $$N = \frac{r_0 + r + R}{\lambda/2}$$

and R is the direct distance between source and receiver. When both source and receiver are well below the crest of the screen the predicted shadowing diverges somewhat from the experimental results at higher frequencies and Fresnel numbers. Nevertheless, the results of equation (14) are some 3 dB closer to experiment than predictions from MacDonald's classic CW theory which has been previously applied to this case.

Noise barriers which have several diffracting edges will produce several impulse responses, each similar to the one in FIG. 2. The impulse responses will overlap and they add arithmetically at their proper times. For each edge the time at which the pulse starts and terminates is calculated, and diffracted pressures are calculated within this time interval.

For each wedge segment the least time path from source over the equivalent infinite wedge to the receiver is defined. In general the least time path does not intersect the finite diffracting edge precisely at its center. Therefore two cases are most likely: (a) the edge which is intersected off-center by the least time path; and (b) the edge which is off-set so that it is not intersected by the least time path. In case (a) when the least time path intersects the edge, the complete p(t) from equation (1) is tabulated as long as the spherical wave front from the source intercepts the edge on both sides of the least time intersection. However, as soon as the intercept on the shorter side of the edge no longer exists only one-half of p(t) is needed. In case (b), the least time path intersects the extrapolation of the edge segment. Then starting from the first instant when the spherical wave reaches the edge only one of the two possible edge intercepts of the spherical wave pulse exists, and only one-half of p(t) from equation (1) is used. In using equation (1) the sampling frequency and the number of samples are selected to have at least several data points from each segement. The impulse is tabulated down to 1% of the peak (−40 dB).

Figure 6A:
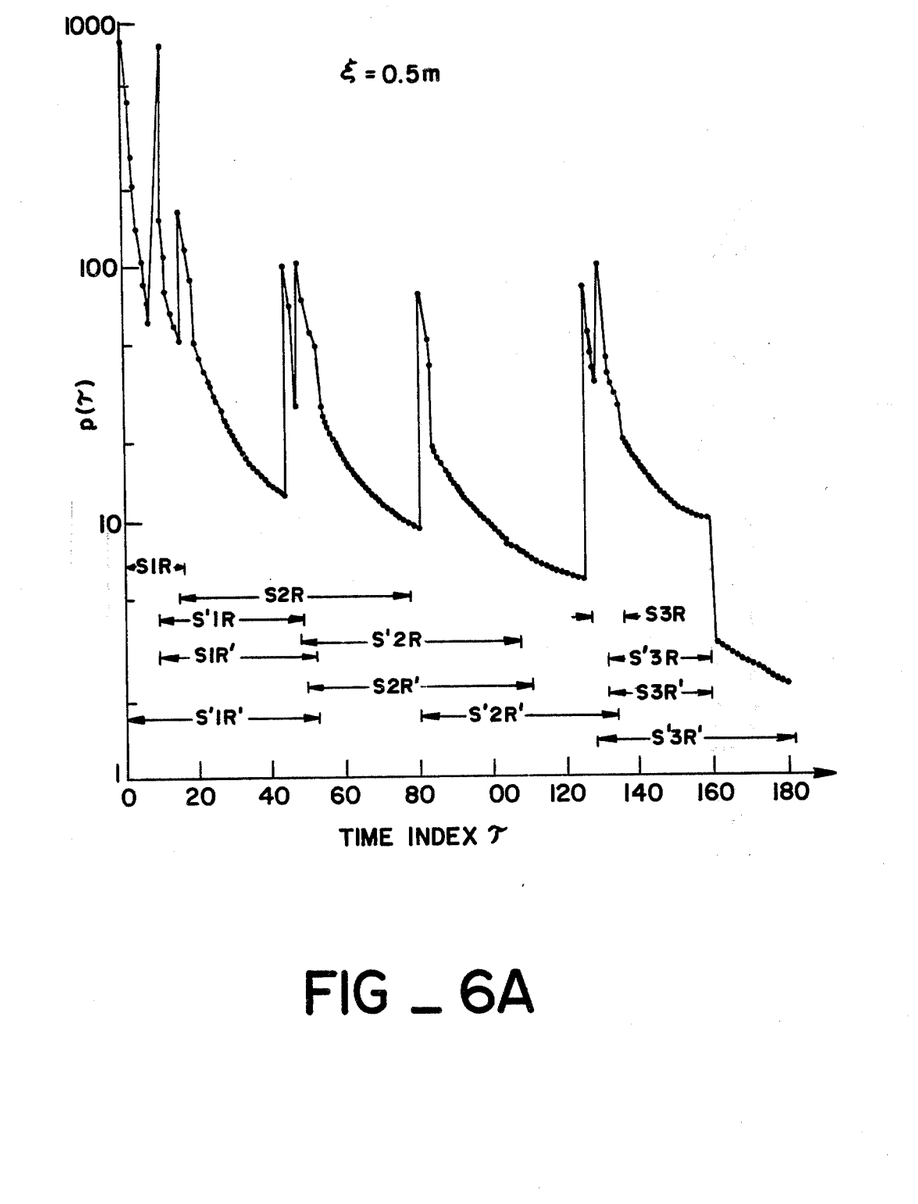
FIGS. 6A & 6B show the total impulse response of a pressure pulse diffracted by a finite barrier for equal ($\xi=1.5$ m) and unequal ($\xi=0.5$ m) impulse cases.
Figure 6B:
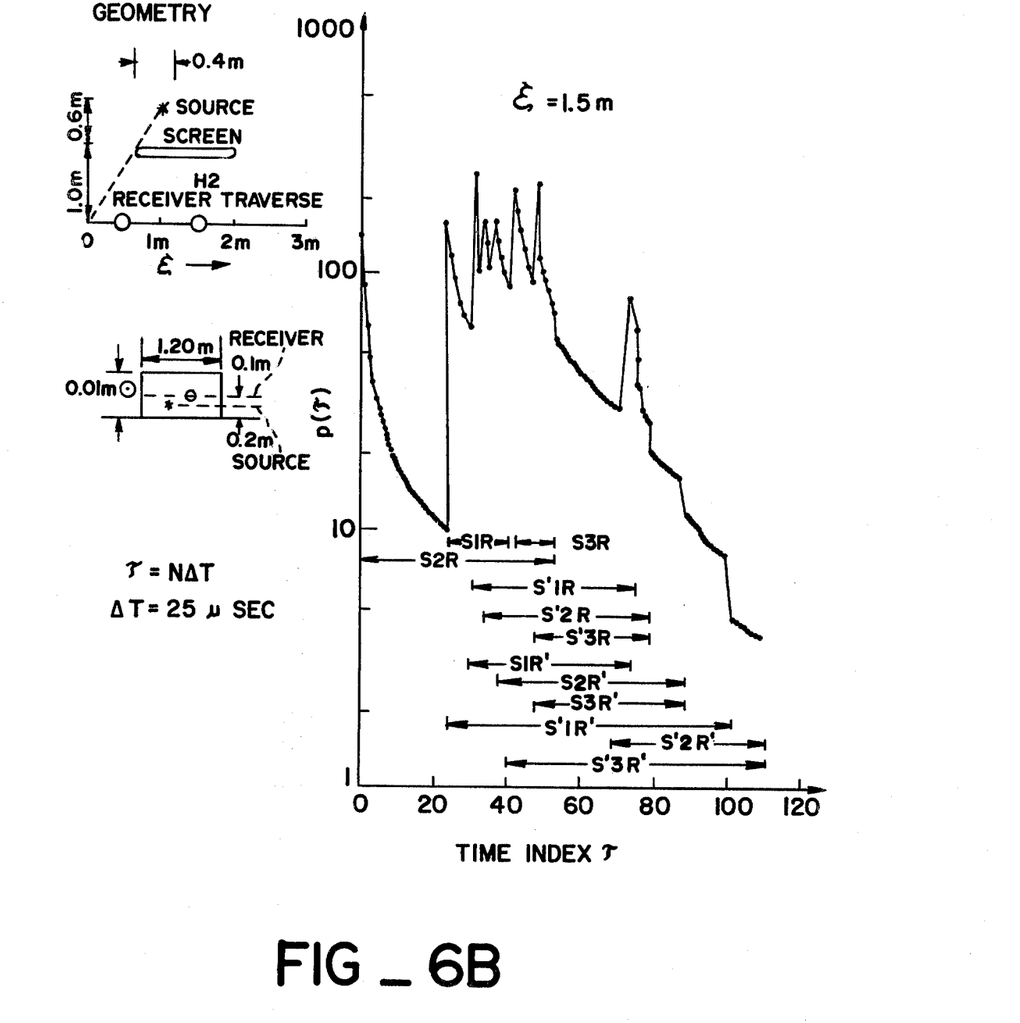

FIGS. 6A-6B show the total impulse response for two of the source/receiver positions of the finite barrier. The times of initiation, duration, and termination are shown for the three component impulses received from left edge, top edge and right edge (1, 2 and 3 respectively) for the four possible combinations of the source (S) and its image (S') and the receiver (R) and its image (R'). There are therefore twelve impulses for a given source and receiver. The ground is a perfect reflector.

For receiver position $\xi=0.5$ m the spherical pulse is received first by way of the S/R and S'/R' paths from source and its image to left side of screen (1) to receiver and its image. There are sudden changes of total impulses when contributions arrive or terminate or when the spherical pulse contacts only one side of an off-center edge.

The impulse for receiver position $\xi=1.5$ m contrasts with that of position $\xi=0.5$ m in that the component impulses have peak values that are nearly the same value (approximately 150) rather than the spread from about 500 to 100 or the case $\xi=0.5$ m.

Figure 7:
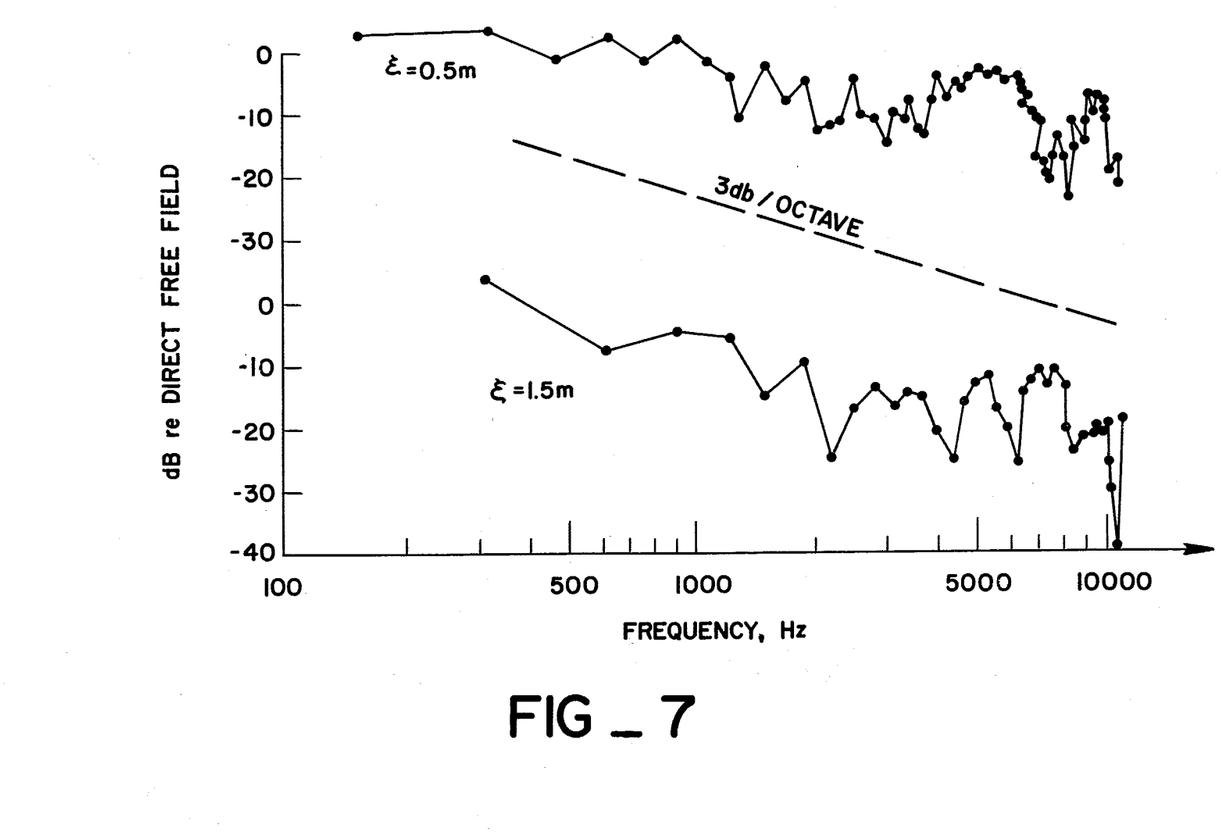
FIG. 7 shows the transforms of the pulse cases described in FIG. 6 representing the attenuation by the barrier for each case.

When the impulse is transformed to frequency space and the insertion loss of the barrier is calculated, it is seen (FIG. 7) that the equal impule case ($\xi=1.5$ m) shows significantly higher attenuations than the unequal impulse situation ($\xi=0.5$ m). The slope of 3 dB/octave shown in FIG. 7 corresponds to the $f^{-\frac{1}{2}}$ behavior for an infinite wedge (equation 10).

Figure 8A:
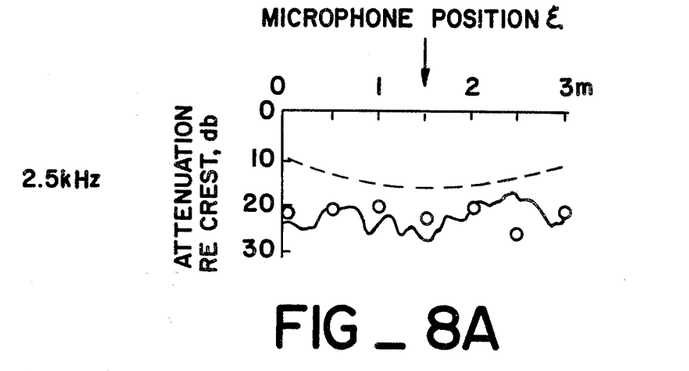
FIGS. 8A–8C illustrate the diffraction losses calculated from transforms of total impulse responses for six receiver positions.
Figure 8B:
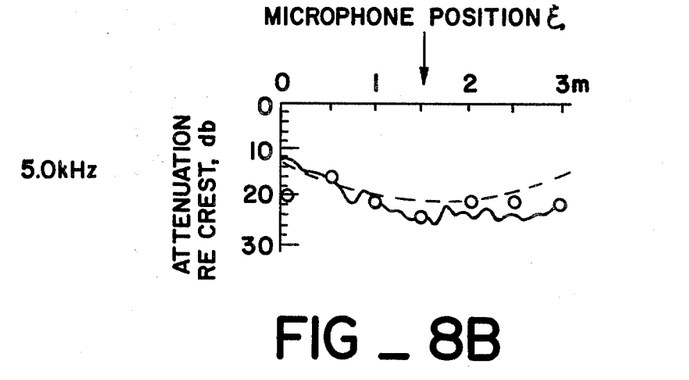
Figure 8C:
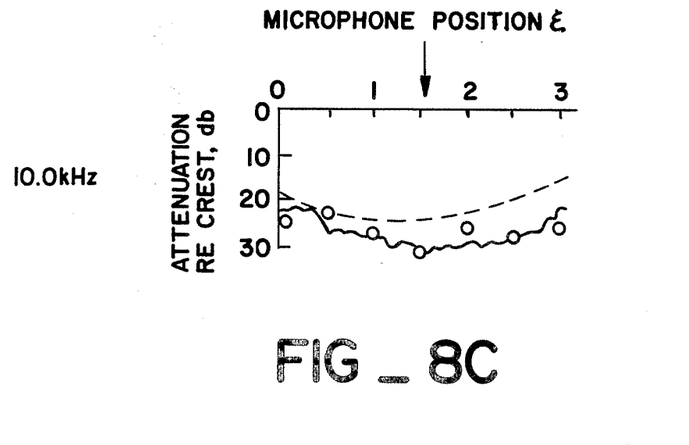

FIGS. 8A-8C present the diffraction losses, equation (14), calculated from the transforms of total impulse responses such as in FIGS. 6A-6B for six receiver positions. These calculations are compared with Maekawa-Kirchhoff's theory and experiment. For comparison with Maekawa's third octave results, the spectral pressure amplitudes were squared and averaged before comparing with the direct pressure at the crest, as used by Maekawa. With the frequency resolution used in the FFT there are three spectral components in the third octave band centered at 2500 Hz, five at 500 Hz and eight in the 10,000 Hz band in this case.

Figure 9:
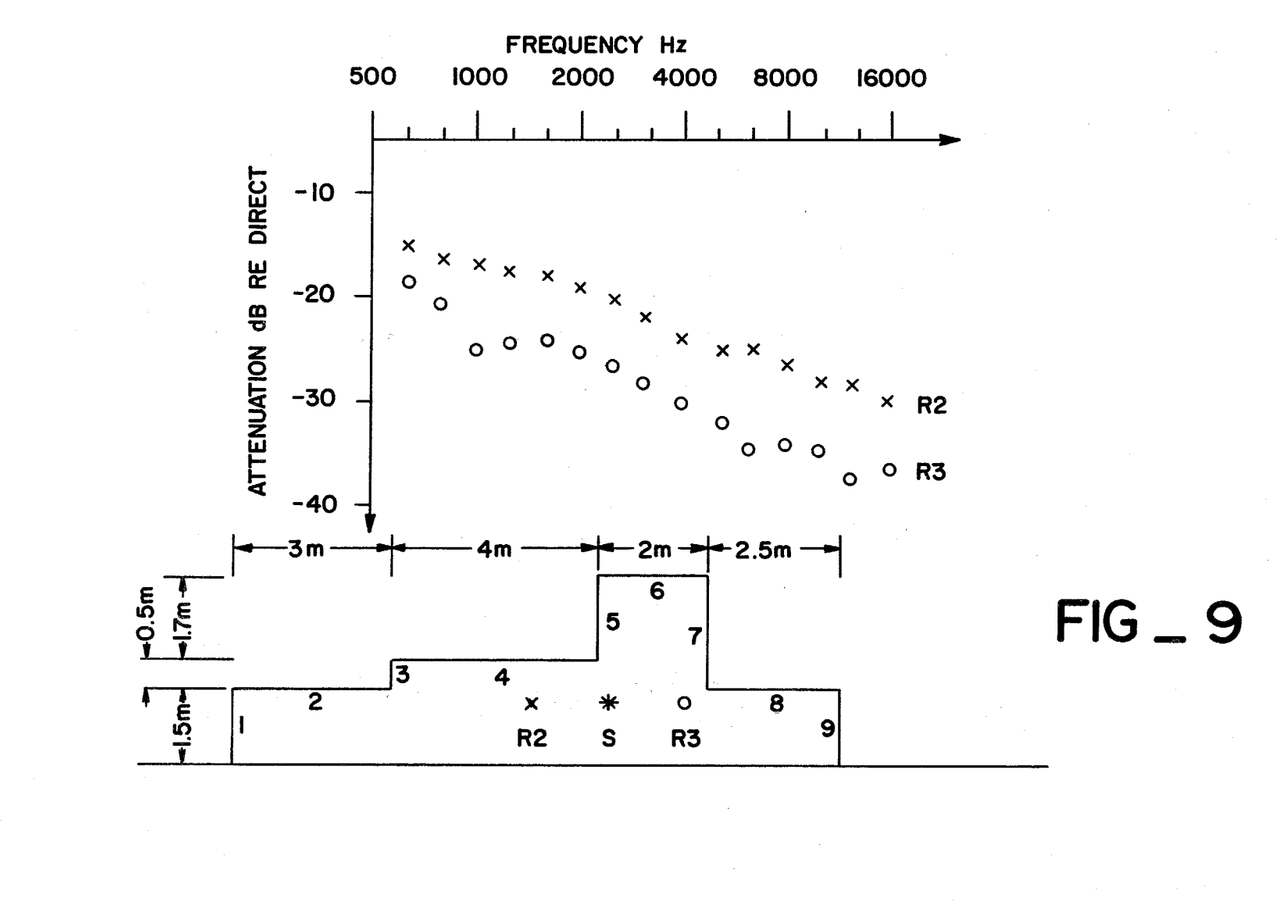
FIG. 9 illustrates the diffraction losses calculated from transforms of total impulse responses for a 9-edged ramshackle barrier.

In order to show the power of the impulse technique a 9-edged ramshackle barrier is studied (FIG. 9). For this case the 512 largest impulse samples are used at intervals of 25 microseconds. The ground is assumed to be absorbent so that the mirror image does not exist.

The print-out of the impulse response in the case of receiver R2 (not plotted) shows that the maximum impulse of magnitude 30.5 (arbitrary units) travels over the horizontal edge 4, just above R2 (see FIG. 9). The next largest is the impulse of strength 6.1 via vertical edge 9, and the third largest has strength 4.2, and is for the impulse that travels over vertical edge 1. Receiver R3 obtains its major contributions differently: the largest amplitude is 12.5 for the path over edge 6, the next largest is 8.0 via edge 9, and the third largest is 6.4 via edge 4. In general the maximum impulses occur for least time paths over diffracting edges; the off-set edges make smaller contributions.

The gross spectral response of the ramshackle barrier decreases at roughly 3 dB/octave, but there are important variations that depend on the receiver position (FIG. 9). Receiver R3 has the advantage of being behind the highest section of the barrier (edges 5, 6, 7) which gains it several dB of additional transmission loss relative to position R2. This improvement is 6 to 9 dB for frequencies higher than 5 kHz, but as low as 3.5 dB advantage at the lowest band shown (630 Hz).

Applying this methodology to a specific noise attenuation situation, given the amount of maximum required attenuation, a finite noise barrier may now be optimally designed to screen a given receiver from a given source. A preliminary design is formulated; the integrated impulses of the edge contributions are compared; based on this comparison the preliminary design is modified to yield equal contributions from each edge. The insertion loss is calculated. This process is iterated until the optimum finite noise barrier is achieved for the maximum required attenuation.

Thus, the present invention provides a method for optimizing the design of finite noise barriers to achieve a maximum required attenuation quickly and at the minimal cost for the noise barrier.

What is claimed is:

1. A method for calculating the optimum response for design of a finite noise barrier comprising the steps of:

(a) defining the proposed edge sections of said finite noise barrier;
(b) calculating the times required for a pulse signal to go from a source to each of said proposed edge sections to a receiver loacted behind said barrier;
(c) identifying the diffracted contribution of each of said edge segments upon said pulse signal by the closed-form impulse solution of Biot-Tolstoy;
(d) determining the mathmatical time series of said diffracted contribution for each of said proposed edge segments as received by said receiver, said time series formulated by taking the Fourier transform of said Biot-Tolstoy solution and a digital transform of the remainder of said Fourier transform and sampling said diffracted contribution a plurality of times according to said time series;
(e) adding said mathmatical time series at equivalent times by superposition to obtain the diffracted impulse response received by said receiver for each of said proposed edge segments;
(f) calculating the impulse response integral for each of said added time series for each of said proposed edge segments;
(g) comparing said impulse response integrals to determine which of said proposed edge segements should be changed to obtain equal diffraction contributions by each of said proposed edge segments;
(h) using a digital computer to iteratively repeat the calculations of said impulse response integrals after changing said proposed edge segments until all of said impulse response integrals are equal;
(i) computing the total impulse response integral of all of said added time series to find the total diffracted impulse response received by said receiver for all of said proposed edge segments; and
(j) transforming by digital Fourier techniques said total diffracted impulse response to obtain the desired frequency response of said barrier.

2. A method for optimally designing a finite noise barrier comprising the steps of:
(a) defining the proposed edge sections of said finite noise barrier;
(b) calculating the signal paths and times for traversal of said paths by a pulse signal between a source on one side of said barrier to each of said proposed edge sections to a receiver on the opposite side of said barrier;
(c) computing the acoustic pressure impulse of the diffraction of said signal by each of said proposed edges of said barrier as received by said receiver;
(d) squaring each of said computed acoustic pressure impulses;
(e) calculating the integral $I_i$ of each of said squared acoustic pressure impulses;
(f) computing the average $<I_i>$ of said integrated, squared acoustic pressure impulses;
(g) calculating the diffraction loss of said signal by each of said proposed edges of said barrier according to the equation $$DL = \left| 10 \log_{10} \frac{I_j}{<I_i>} \right|$$

where $I_j$ is the computed acoustic pressure impulses of the jth one of said proposed edges, j is equal in number to the number of said proposed edge segements;
(h) adjusting the dimension of said proposed edge segment under calculation and iterating steps (a) through (g) until DL is less than 1 decibel for each of said proposed edge segments; and
(i) performing a fast Fourier transform of the final acoustic pressure impulse of step (e) that satisfies step (h) to determine the frequency attenuation of said signal by said barrier.

* * * * *